US009750999B2

(12) United States Patent
Monaco

(10) Patent No.: US 9,750,999 B2
(45) Date of Patent: Sep. 5, 2017

(54) MOBILE FITNESS UNIT

(71) Applicant: Mobile Fitness Equipment, Inc., Braintree, MA (US)

(72) Inventor: Greg P. Monaco, Braintree, MA (US)

(73) Assignee: MOBILE FITNESS EQUIPMENT, INC., Braintree, MA (US)

( * ) Notice: Subject to any disclaimer, the term of this patent is extended or adjusted under 35 U.S.C. 154(b) by 0 days.

(21) Appl. No.: 14/784,254

(22) PCT Filed: Apr. 9, 2014

(86) PCT No.: PCT/US2014/033507
§ 371 (c)(1),
(2) Date: Oct. 13, 2015

(87) PCT Pub. No.: WO2014/169042
PCT Pub. Date: Oct. 16, 2014

(65) Prior Publication Data
US 2016/0059104 A1 Mar. 3, 2016

Related U.S. Application Data

(60) Provisional application No. 61/810,352, filed on Apr. 10, 2013.

(51) Int. Cl.
*A63B 17/00* (2006.01)
*A63B 71/02* (2006.01)
(Continued)

(52) U.S. Cl.
CPC ............ *A63B 71/023* (2013.01); *A63B 17/00* (2013.01); *A63B 71/02* (2013.01); *B60P 3/025* (2013.01);
(Continued)

(58) Field of Classification Search
CPC .............. B60P 3/14; A63B 17/00; E04H 3/14
See application file for complete search history.

(56) References Cited

U.S. PATENT DOCUMENTS

| 4,958,874 A | 9/1990 | Hegedus |
| 5,667,267 A | 9/1997 | Talucci |
| (Continued) | | |

FOREIGN PATENT DOCUMENTS

KR 10-0802102 B1 2/2008

OTHER PUBLICATIONS

International Search Report and Written Opinion mailed Aug. 13, 2014 in PCT Application No. PCT/US2014/033507.

*Primary Examiner* — John Walters
*Assistant Examiner* — James Triggs
(74) *Attorney, Agent, or Firm* — Foley & Lardner LLP; Christopher J. McKenna; Daniel Rose

(57) ABSTRACT

The present application is directed to a mobile fitness unit in an automatically folding shipping container. The mobile fitness unit may be towed or air lifted into position, and unfolded to create a sturdy and flat platform for use. Frames may be extended out from the roof of the unfolded shipping container to form pull up bars and squat racks, or provide stable mounts for equipment such as lateral pull-down cables, punching bags, or other apparatuses. The mobile fitness unit may provide exercise positions for a dozen or more individuals simultaneously. After use, the frames may be collapsed and the sides of the container folded to seal the unit for movement.

18 Claims, 19 Drawing Sheets

(51) Int. Cl.
*E04H 3/14* (2006.01)
*B60P 3/14* (2006.01)
*B60P 3/025* (2006.01)
*A63B 21/072* (2006.01)
*A63B 71/00* (2006.01)
*E04H 1/12* (2006.01)

(52) U.S. Cl.
CPC .............. *B60P 3/14* (2013.01); *E04H 3/14* (2013.01); *A63B 21/072* (2013.01); *A63B 71/0036* (2013.01); *A63B 2071/025* (2013.01); *A63B 2210/50* (2013.01); *E04H 2001/1283* (2013.01)

(56) References Cited

U.S. PATENT DOCUMENTS

| | | | |
|---|---|---|---|
| 7,930,857 B2 * | 4/2011 | Pope | E04B 1/3431 52/64 |
| 2011/0023925 A1 | 2/2011 | Johnson et al. | |
| 2013/0053220 A1 | 2/2013 | Monaco | |

* cited by examiner

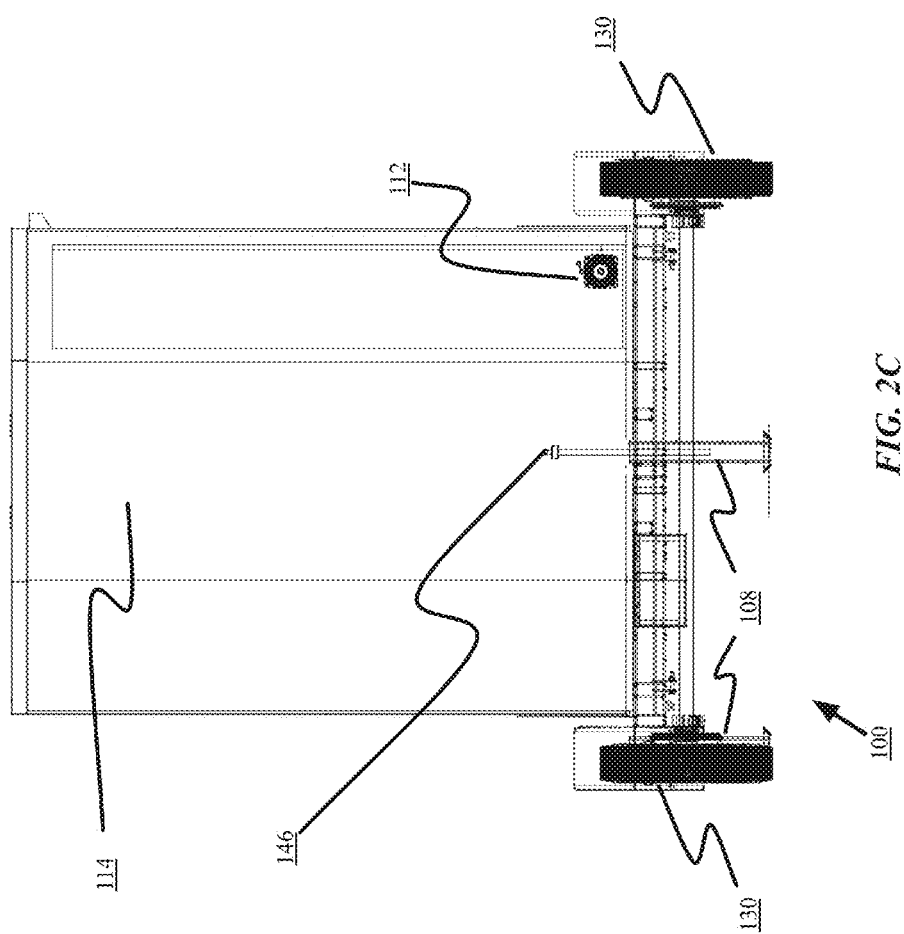

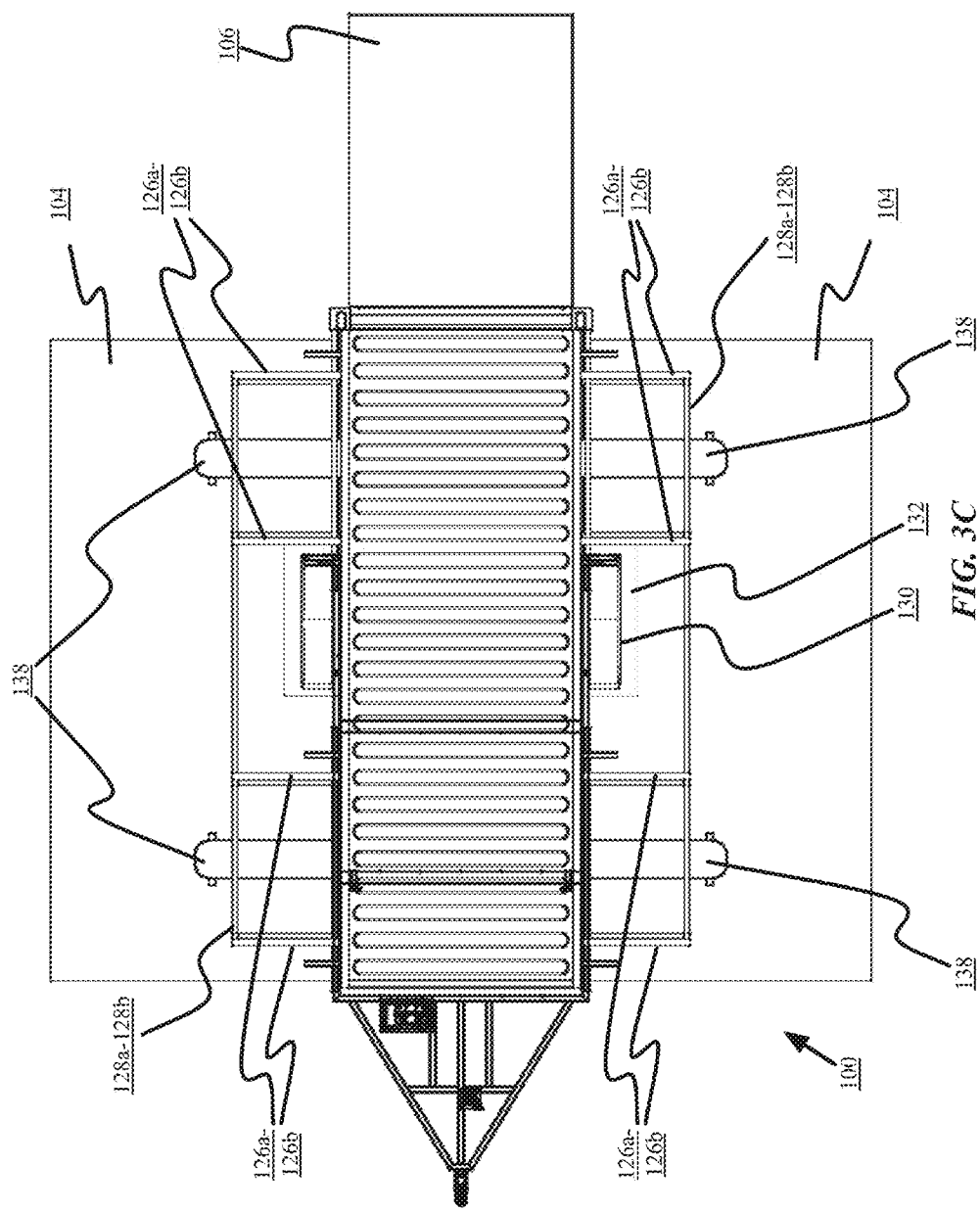

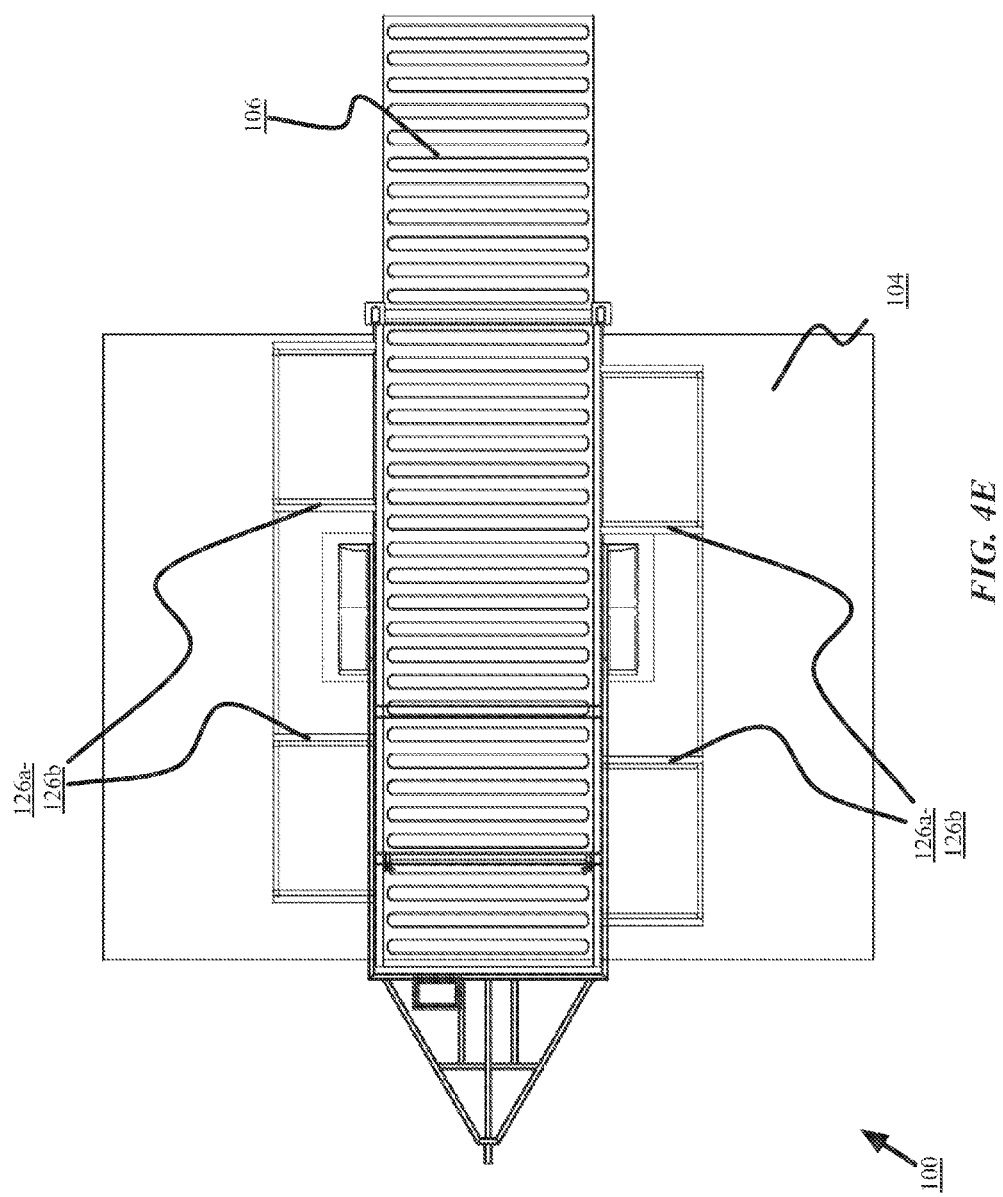

MOBILE FITNESS UNIT

RELATED APPLICATIONS

The present application claims priority as a national stage entry to and the benefit of P.C.T. Application No. PCT/US2014/033507, entitled "Mobile Fitness Unit" and filed Apr. 9, 2014; which claims priority to U.S. Provisional Patent Application No. 61/810,352, entitled "Mobile Fitness Unit," filed Apr. 10, 2014, the entirety of each of which is hereby incorporated by reference.

FIELD OF THE INVENTION

The methods and systems described herein relate generally to fitness equipment. In particular, the methods and systems described herein relate to a mobile fitness unit in a modified shipping container.

BACKGROUND OF THE INVENTION

Outdoor fitness training has experienced a recent surge in popularity, with "boot camp" programs simulating military basic training regimens. These programs frequently take place in public parks or elsewhere, and incorporate jogging or running, aerobic exercises such as jumping jacks or rope skipping, and bodyweight exercises such as push-ups, squats, leg lunges, and sit-ups. However, while some cities have provided fixed structures in parks for performing pull-ups or other exercise routines, such equipment is not widely available, limiting the variety of exercises that may be performed.

Similarly, not everyone has access to a well-equipped gym, due to location or expense. While many advances have been made in home gym equipment, such devices typically are not highly portable, and thus may be inadequate for the fitness needs of contractors or other professions who frequently travel for work. For example, military personnel or contractors and energy or mineral industry employees may be deployed to or stationed overseas or in non-urban locations, and remaining fit may be critical for performance, injury avoidance, etc. While permanent bases may have fitness equipment, temporary bases or work locations frequently do not.

One typical attempt to transport fitness equipment includes stocking a shipping container with the equipment in racks mounted to the inside walls of the counter. Such containers may be shipped or towed to a location, and then users may remove the equipment for use on the surrounding ground. While this may be adequate in situations where the container is brought to a parking lot or other hard, flat terrain, it may be unsafe if the ground is not flat, is rocky, is grassy, or has other conditions that may interfere with stable footing of users. Additionally, because the equipment must be manually packed and unpacked by users, set up and breakdown may be complex and time consuming. Furthermore, while such systems may be fine for some exercises that do not need extra equipment beyond the weights, such as deadlifts, they may lack sturdy equipment for bodyweight exercises such as pull ups or chin ups, or stable racks for safely performing squats.

SUMMARY OF THE INVENTION

The present application is directed to a mobile fitness unit in an automatically folding shipping container. The mobile fitness unit may be towed or air lifted into position, and unfolded to create a sturdy and flat platform for use. Frames may be extended out from the roof of the unfolded shipping container to form pull up bars and squat racks, or provide stable mounts for equipment such as lateral pull-down cables, punching bags, or other apparatuses. The mobile fitness unit may provide exercise positions for a dozen or more individuals simultaneously. After use, the frames may be collapsed and the sides of the container folded to seal the unit for movement.

In one aspect, the present disclosure is directed to a folding mobile fitness unit. The mobile fitness unit includes a floor; a plurality of beams attached to the floor; and a roof supported by the plurality of beams. The mobile fitness unit also includes at least one panel attached to an edge of the floor at a corresponding edge of said panel by a joint having one degree of freedom, the panel configured to rotate between a position parallel to the floor and a position orthogonal to the floor. The mobile fitness unit further includes at least one collapsible frame attached to an upper portion of one or more of the plurality of beams by a joint having one degree of freedom, the collapsible frame configured to extend outward laterally from the one or more beams when the panel is rotated to the position parallel to the floor.

In some embodiments, each at least one collapsible frame includes at least one leg, comprising an upper portion and an extendable lower portion. The collapsible frame also includes at least one upper lateral support, attached to the upper portion of the at least one leg and the upper portion of the one or more of the plurality of beams by the joint having one degree of freedom. The collapsible frame further includes at least one lower lateral support, attached to the extendable lower portion of the at least one leg and a lower portion of the one or more of the plurality of beams. In a further embodiment, the collapsible frame further includes a pole attached to at least two upper lateral supports and/or the upper portions of at least two corresponding legs. In a still further embodiment, the pole is configured to serve as a pull-up bar. In another still further embodiment, the pole is configured to support at least one hanging fitness apparatus. In another further embodiment, the at least one upper lateral support is attached to the upper portion of the at least one leg by a joint having one degree of freedom. In yet another further embodiment, the at least one lower lateral support is attached to the lower portion of the at least one leg by a joint having one degree of freedom. In still yet another further embodiment, the at least one lower lateral support is attached to the lower portion of the one or more of the plurality of beams by a joint having one degree of freedom. In yet still another further embodiment, the collapsible frame collapses inwards to a position between the floor and roof and inside of the panel, when the panel is rotated to the position orthogonal from the floor. In a still further embodiment, the collapsible frame is pushed inwards to the position between the floor and roof by the panel during rotation of the panel to the position orthogonal from the floor. In yet another further embodiment, the collapsible frame is configured to act as a power rack when the panel is rotated to the position parallel to the floor.

In some embodiments, the folding mobile fitness unit includes at least one winch attached to the at least one panel by a cable for rotating the panel between the position parallel to the floor and the position orthogonal to the floor. In other embodiments, the folding mobile fitness unit includes at least one axel and pair of wheels attached beneath the floor; and a towing hitch. In a further embodiment, the at least one panel further comprises an opening positioned to receive a wheel of the pair of wheels when the panel is in the position parallel to the floor. In a still further embodiment, the mobile fitness unit includes a second at least one panel at least as large as the opening, fixed orthogonally to the floor and positioned to be adjacent to the opening when the panel is in the position orthogonal to the floor. In another further embodiment, the mobile fitness unit includes at least one jack for supporting the panel off the ground in the position parallel to the floor. In a still further embodiment, the at least one jack is attached to the at least one panel.

In one embodiment, the folding mobile fitness unit includes a storage and access area. In another embodiment, the folding mobile fitness unit includes at least one equipment rack attached to the floor. In some embodiments, the folding mobile fitness unit includes two side panels and a rear panel, each attached to a corresponding edge of the floor at the corresponding edge of said panel by a joint having one degree of freedom, each panel configured to rotate in a different direction outward from the floor.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which:

FIGS. 2C and 2D are front and rear views, respectively, of the central portion of the mobile fitness unit of FIG. 1B;

FIGS. 3B, 3C, and 3D are side, top, and rear views of the unfolded mobile fitness of FIG. 3A;

FIG. 4E is a top view of another embodiment of a mobile fitness unit illustrating another implementation of folding the unit using offset frames;

Figure 1A:
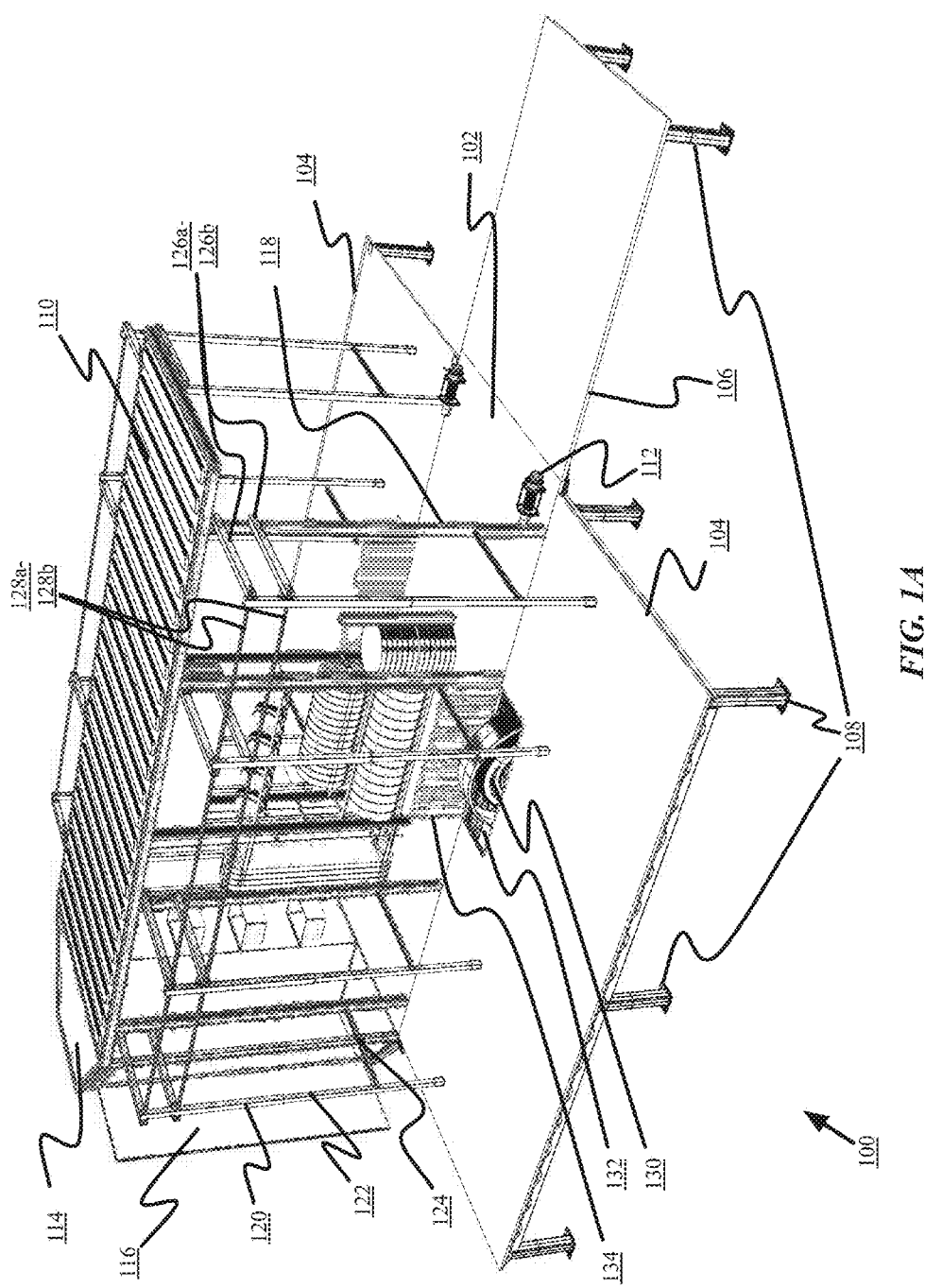
FIG. 1A is a perspective view of an embodiment of an unfolded mobile fitness unit.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

The present application is directed to a mobile fitness unit in an automatically folding shipping container. The mobile fitness unit may be towed or air lifted into position, and unfolded to create a sturdy and flat platform for use. Frames may be extended out from the roof of the unfolded shipping container to form pull up bars and squat racks, or provide stable mounts for equipment such as lateral pull-down cables, punching bags, or other apparatuses. The mobile fitness unit may provide exercise positions for a dozen or more individuals simultaneously. After use, the frames may be collapsed and the sides of the container folded to seal the unit for movement.

Illustrated in FIG. 1A is a perspective view of an embodiment of an unfolded mobile fitness unit 100. The mobile fitness unit may comprise a central floor 102, side panels 104, a rear panel 106, each joined to the central floor by hinges, pins, or similar fasteners allowing one degree of freedom or rotation of side panels 104 and rear panel 106 while restricting translation of the panels. In many embodiments, the hinges or fasteners may comprise external hinges, such that there is a minimal gap between the panels and central floor 102 and no protrusions that may be tripping hazards. In some embodiments, the hinges may comprise piano hinges or hinges along the length of the edge between each panel and the central floor 102. The mobile fitness unit may also comprise a roof 110. The roof 110 may be elevated by a height equal to the length of each side panel 104 on a plurality of pillars or beams 118. In some embodiments, the mobile fitness unit 100 may include a front panel (not illustrated), while in other embodiments, the mobile fitness unit 100 may include a storage and access section 114 as shown. In embodiments utilizing a front panel, the front panel may also be hinged to open in a similar fashion to rear panel 106. The panels, roof, and floor may be made out of any suitable material, including aluminum, steel, wood, wood paneling, or other material. In many embodiments, the beams 118 may be made of steel, iron, aluminum, wood, or any other material. In some embodiments, inside surfaces of the floor 102 and panels 104, 106 may be joined to a second material, such as rubber, neoprene, carpet, or other material, to reduce noise, provide padding, provide secure footing in the presence of moisture, or other features. In some embodiments, roof 110 may include wiring and/or mounts for one or more lights, video monitors, speakers, cameras, or other features (not illustrated). In another embodiment, roof 110 may include extendable shades or tarps (not illustrated), such as on retractable rolls mounted to the underside of roof 110, that may be extended out laterally from the roof 110 to poles or stakes (not illustrated) to provide sun or rain protection for users.

In some embodiments, the mobile fitness unit 100 may have a truss frame and one or more axels supporting wheels 130, to allow towing of the mobile fitness unit 100 into location. In embodiments with a single axel, to prevent tipping when not being towed, the mobile fitness unit 100 may include legs or landing gear to extend to the ground when stationary. Because embodiments with axels may raise the floor 102 to at least the height of the axel, the mobile fitness unit 100 may include one or more supports or jacks 108 that may be extended to support panels 104, 106 when unfolded, as well as level the mobile fitness unit 100. Jacks 108 may be mounted to panels 104, 106 and floor 102 and extended after unfolding, or may be manually positioned or fastened to the panels and/or floor after unfolding. For example, the jacks 108 may include pins to mate with corresponding holes in panels 104, 106. In other embodiments in which jacks 108 are mounted to the panels, the jacks may be hinged to lie flat against the panels when the mobile fitness unit 100 is folded. As shown, in some embodiments, the wheels 130 may protrude through openings 132 in panels 104 when the panels 104 are unfolded. This may reduce the required height of floor 102 and unfolded panels 104, 106. An upright panel 134 may fill opening 132 when panel 104 is folded upright, or may be slightly larger than opening 132 to block the opening 132 when panel 104 is folded upright, to prevent dust, moisture, or animals from entering the mobile fitness unit 100 when the panels 104, 106 are closed. In other embodiments, floor 102 may be raised higher on a truss frame such that the panels 104 unfold over the wheels and no opening is necessary. Such embodiments may require stairs or ladders for access by users when the panels are unfolded. In many embodiments, jacks 108 may be independently adjustable such that panels 104, 106 may be horizontal, even on rough terrain. Jacks 108 may be manually adjusted, such as with ratcheting cranks or levers, or may be hydraulic or powered.

In some embodiments, mobile fitness unit 100 may include a storage/access area 114, which may comprise a lockable storage closet for securing items such as laptops, audio or video players or recorders; may comprise a small toilet, sink, and/or shower; storage for towels, chalk, tape, or other items; or other such features. In some embodiments, the storage/access area 114 may include a door 116, which may allow access to the inside of the mobile fitness unit 100 when panels 104, 106 are folded into closed positions.

The mobile fitness unit may include a frame for performing pull-ups or chin-ups; supporting weights for squats or other exercises as a power cage, squat cage or squat rack; mounting equipment such as punching bags or pulleys; or other such features. The frame may comprise one or more legs having an upper portion 120 and lower portion 122; one or more lower lateral supports 124; one or more upper lateral supports 126a-126b; and one or more transverse supports or poles 128a-128b. Legs, supports, and poles 120-128 may comprise aluminum, steel, iron, wood, plastic, or any combination of these or other materials. In some embodiments, legs, supports, and/or poles 120-128 or a portion of legs, supports, and/or poles may be coated in rubber or neoprene, surrounded with molded plastic, or otherwise wrapped or coated to reduce noise or vibration, such as when a user lowers a weight bar to rest on lower lateral supports 124.

In many embodiments, a lower portion 122 of a leg may slidingly fit within a hollow center of an upper portion 120 of a leg. The lower portion 122, sometimes referred to as the lower leg, may be extended as shown and locked into position with a removable pin, latch, clamp, push-button latch, or other feature. For example, the lower portion 122 and upper portion 120 may have corresponding holes through which a cotter pin may be inserted. During folding of the mobile fitness unit, in many embodiments, the lower portion 122 of a leg may be retracted into the upper portion 120 of the leg and locked into position such that it is not braced against or interfering with rotation of panel 104.

A lower lateral support 124 may be attached to a lower portion 122 of a leg and a beam 118 via a clamp, latch, or other means. In some embodiments, the lower portion 122 of the leg and/or the beam 118 may include a hole or opening slightly larger than the lower later support 124, such that the support 124 may be inserted through the hole or holes. In other embodiments, a portion of the support 124 may be threaded for inserting into corresponding threaded holes in the lower portion 122 of the leg and/or the beam 118. In still other embodiments, the lower portion 122 of the leg and/or the beam 118 may include a rest, ledge, or pocket that may support the lower lateral support 124 from below, but allow the support 124 to be freely lifted upwards and removed for folding of the mobile fitness unit 100. In yet still other embodiments, the lateral support 124 may be connected via hinges to the lower leg 122 and beam 118. In such embodiments, when the lower portion 122 of the leg is retracted for folding of the mobile fitness unit 100, the lower lateral support 124 may rotate accordingly. In many embodiments, lower lateral support 124 may be used to support weights or prevent weights from being lowered past the lateral support 124, for example, as safety stops for bench presses or squats. In a further embodiment, beams 118 and lower portions 122 of legs may have a plurality of attachment points for lower lateral supports 124, such that the supports 124 may be raised or lowered to adjust for the user. In other embodiments, supports 124 may be at a lower positions and the user may install removable risers of metal, plastic, rubber, or other materials on each support 124 to provide a higher safety stop.

One or more upper lateral supports 126 may be attached to an upper portion 120 of a leg and a beam 118, via a clamp, latch, or other means. In many embodiments, one or both attachments may be hinged or comprise pin attachments, allowing one degree of freedom or rotation of the supports for folding of the mobile fitness unit. In some embodiments, the supports 126 may only be hinged or attached to a pin at a terminal portion adjacent to beam 118, and may be fixed to the upper portion 120 of the leg at the other terminal portion.

One or more poles 128a-128b may be attached to a corresponding one or more upper lateral supports 126a-126b and one or more upper portions 120 of legs. In some embodiments, a pole 128 may extend through multiple lateral supports 126 and upper portions 120, having a length close to that of the mobile fitness unit 100. In other embodiments, multiple poles 128 may be employed, with each only reaching between two adjacent lateral supports 126. In some embodiments, a pole 128 may extend through holes in lateral supports 126 and upper portions 120 of legs as a pin of a joint formed by each support 126 and upper portion 120, while allowing the support 126 and portion 120 to rotate. In other embodiments, the pole 128 may be fixed to each support and portion, keeping them in a fixed angle to each other. Poles 128 may, in many embodiments, be used for pull ups or chin ups or similar exercises, or may be used to support or hang exercise equipment such as punching bags, pull down pulleys, ropes, or other means.

The mobile fitness unit 100 may include one or more motors or winches 112 for raising and lowering panels 104, 106. As shown, in some embodiments, winches 112 may be located at corners of floor 112, while in other embodiments, winches 112 may be located along an underside of roof 110. Winches 112 may wind cables (not illustrated) that may be attached to outward portions of panels 104, 106. In some embodiments, the cables may extend upwards along or through a hole in a beam 118, to a position near roof 110, and then turn via a pulley to extend outwards to attach to an edge or corner portion of panels 104, 106. In many embodiments, cables may be steel, with sufficient strength to pull panels 104, 106 closed. In some embodiments, a single winch may wind multiple cables. For example, a winch 112 may wind a first cable attached to a first corner of a panel 104 and a second cable attached to another corner of the panel 104, allowing raising of the panel in a stable and balanced fashion. In many embodiments, the cables may attach to the panels via releasable hooks latches, such that, once the panels are lowered for use, the cables may be detached and retracted or coiled near beams 118, to eliminate tripping hazards.

In some embodiments, the length of panels 104, 106 may be equal to the height of beams 118, such that when raised, the panels 104, 106 form the complete sides of the container. In other embodiments, the length of panels 104 or 106 may be less than the height of beams 118. In such embodiments, additional panels may be attached to the roof and extend downwards partway, such that when closed, panels 104 or 106 meet said additional panels to form the sides. In one such embodiments, an upper panel may rest on or be attached to upper lateral supports 126, such that when the frame is collapsed or folded as discussed in connection with FIGS. 4A-4D below, the panel closes from the top in a similar fashion to panels 104, 106 being raised.

Figure 1B:
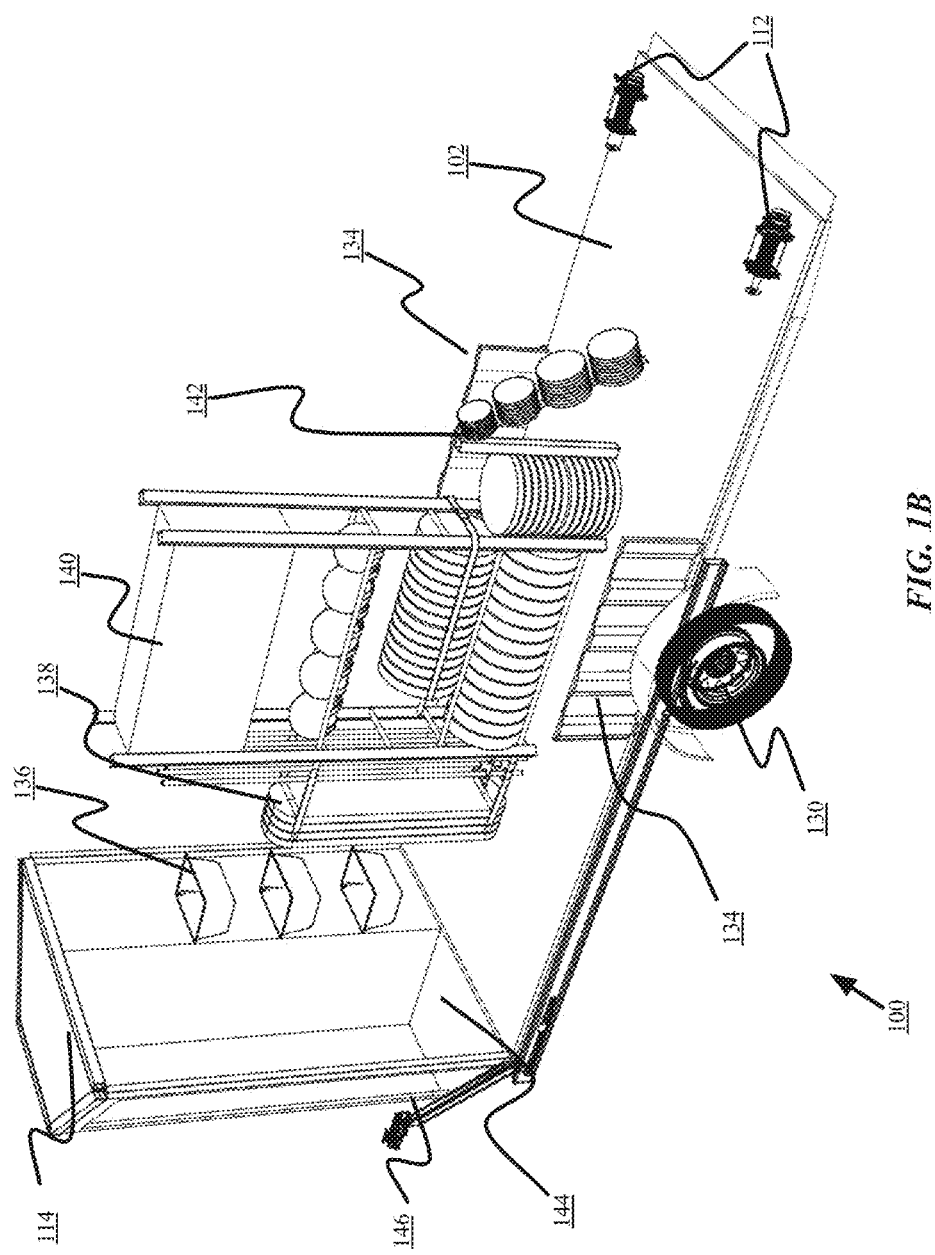
FIG. 1B is a perspective view of a central portion of an embodiment of the unfolded mobile fitness unit of FIG. 1A.

FIG. 1B is a perspective view of a central portion of an embodiment of the unfolded mobile fitness unit 100 of FIG. 1A, with panels 104, 106, roof 110, equipment frames, and beams 108 removed for clarity. In many embodiments, storage/access area 114 may include an open portion 144 as shown, which may be closed by a door 116 (illustrated in FIG. 1A), for access to the interior of the mobile fitness unit 100 when the panels are closed. In some embodiments, storage/access area 114 may include storage bins 136 for storing clipboards, notes, chalk, tape, jump ropes, exercise bands, or other accessories. In other embodiments, storage/access area 114 may include drawers, shelves, lockers, or any other such features. Weights and workout equipment may be stored in the mobile fitness unit 100 in one or more racks 140 and/or plate holders 142. Exercise benches 138 may interlock for storage and be held by cables or latches or other means. In many embodiments, the mobile fitness unit 100 may include a drawbar or hitch 146 for towing.

Figure 2A:
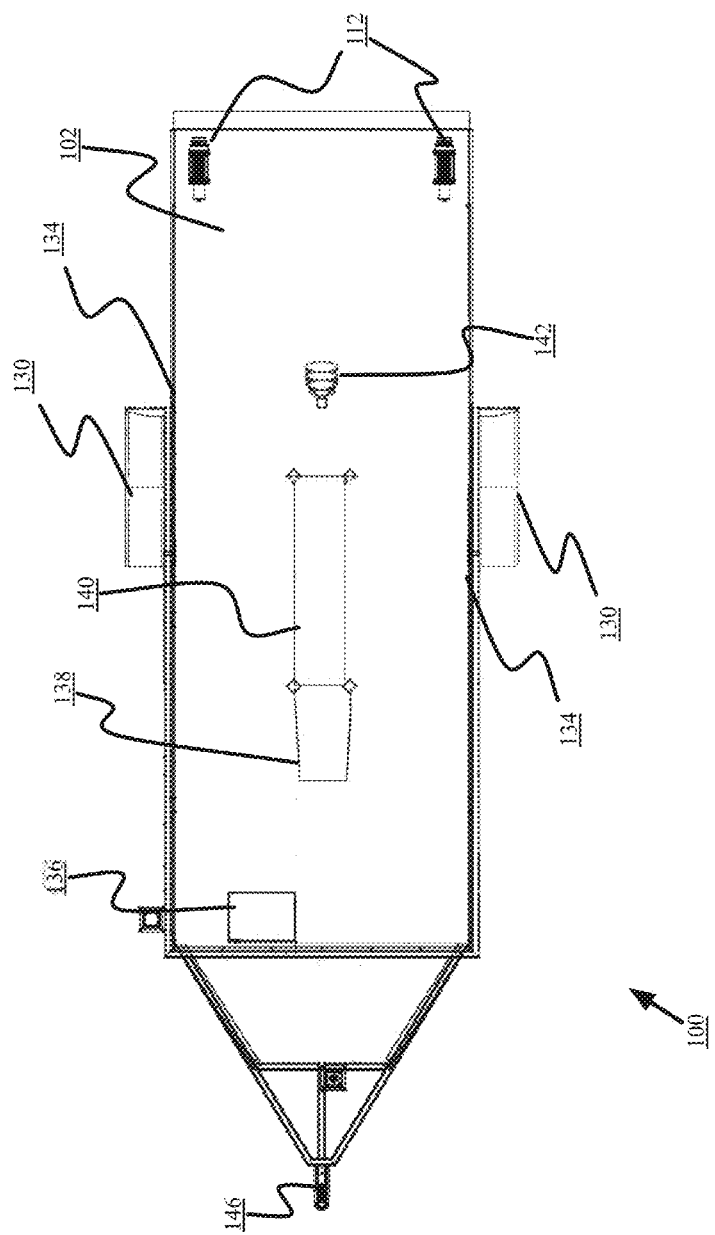
FIGS. 2A and 2B are top and bottom views, respectively, of the central portion of the mobile fitness unit of FIG. 1B.
Figure 2B:
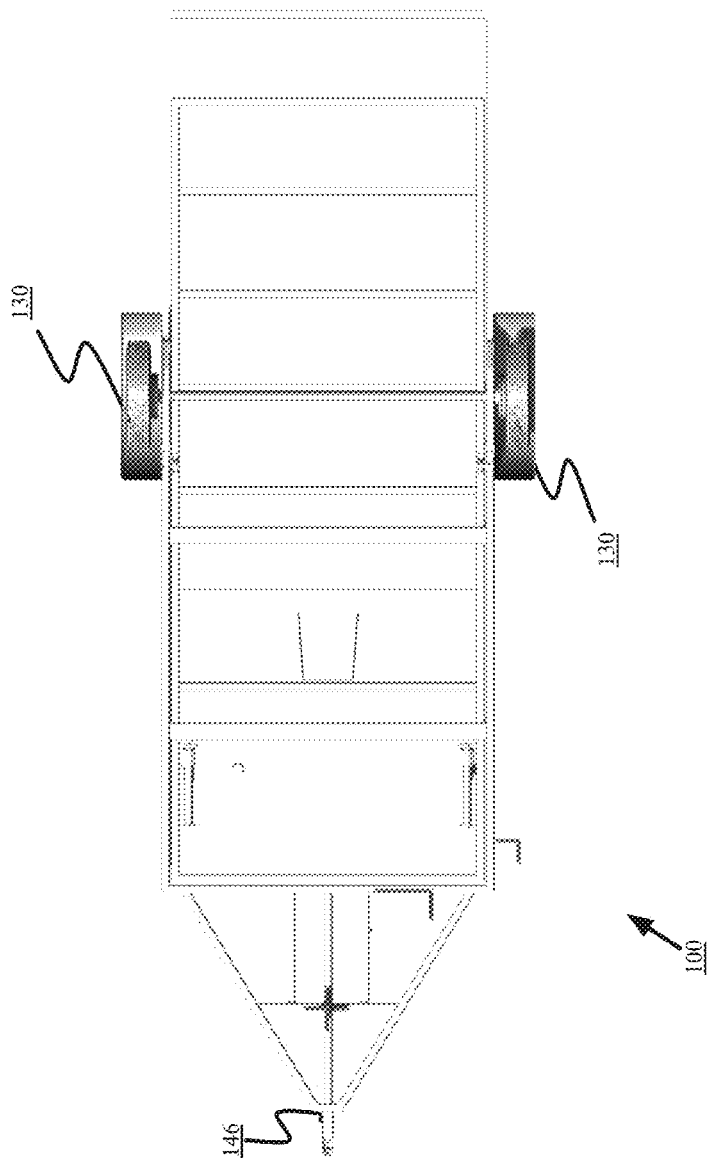

FIGS. 2A and 2B are top and bottom views, respectively, of the central portion of the mobile fitness unit of FIG. 1B. Although only one axel and two wheels are illustrated in FIG. 2B, in many embodiments, the mobile fitness unit 100 may include multiple axels and wheels. In other embodiments, the mobile fitness unit 100 may include no axels or wheels and may be lifted into position by a crane, forklift, helicopter, or other means.

Figure 2D:
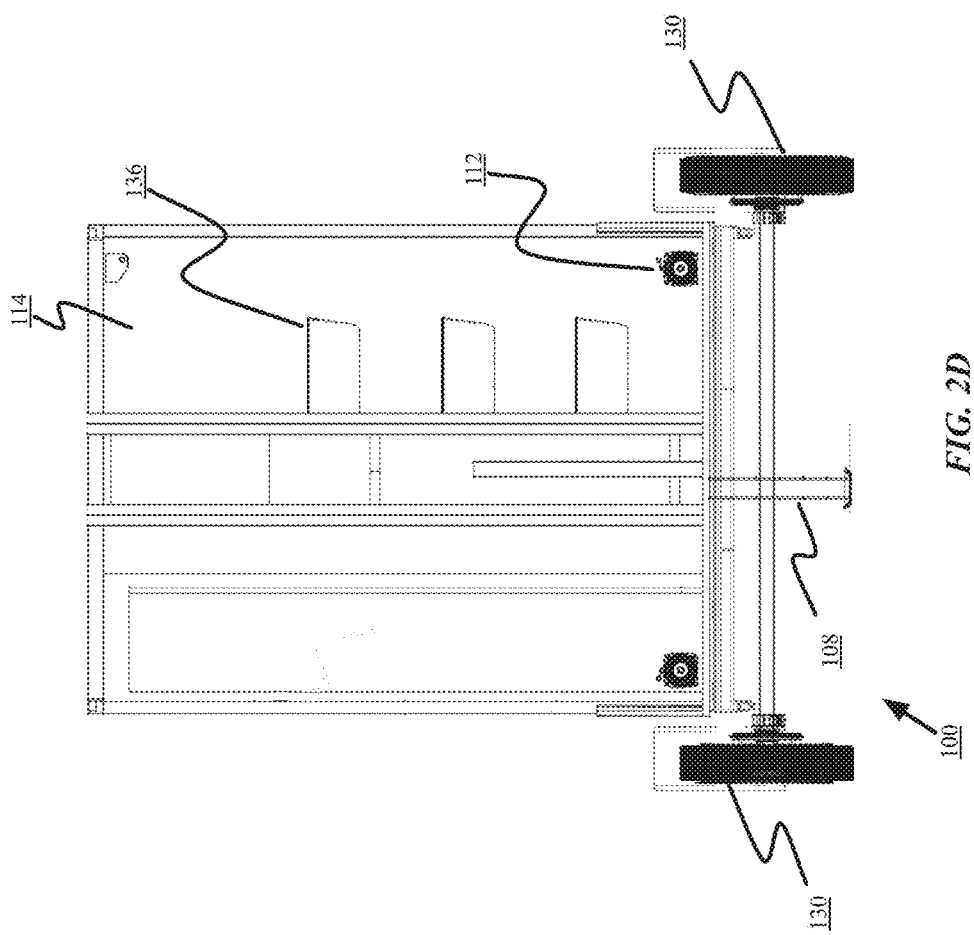
Figure 2E:
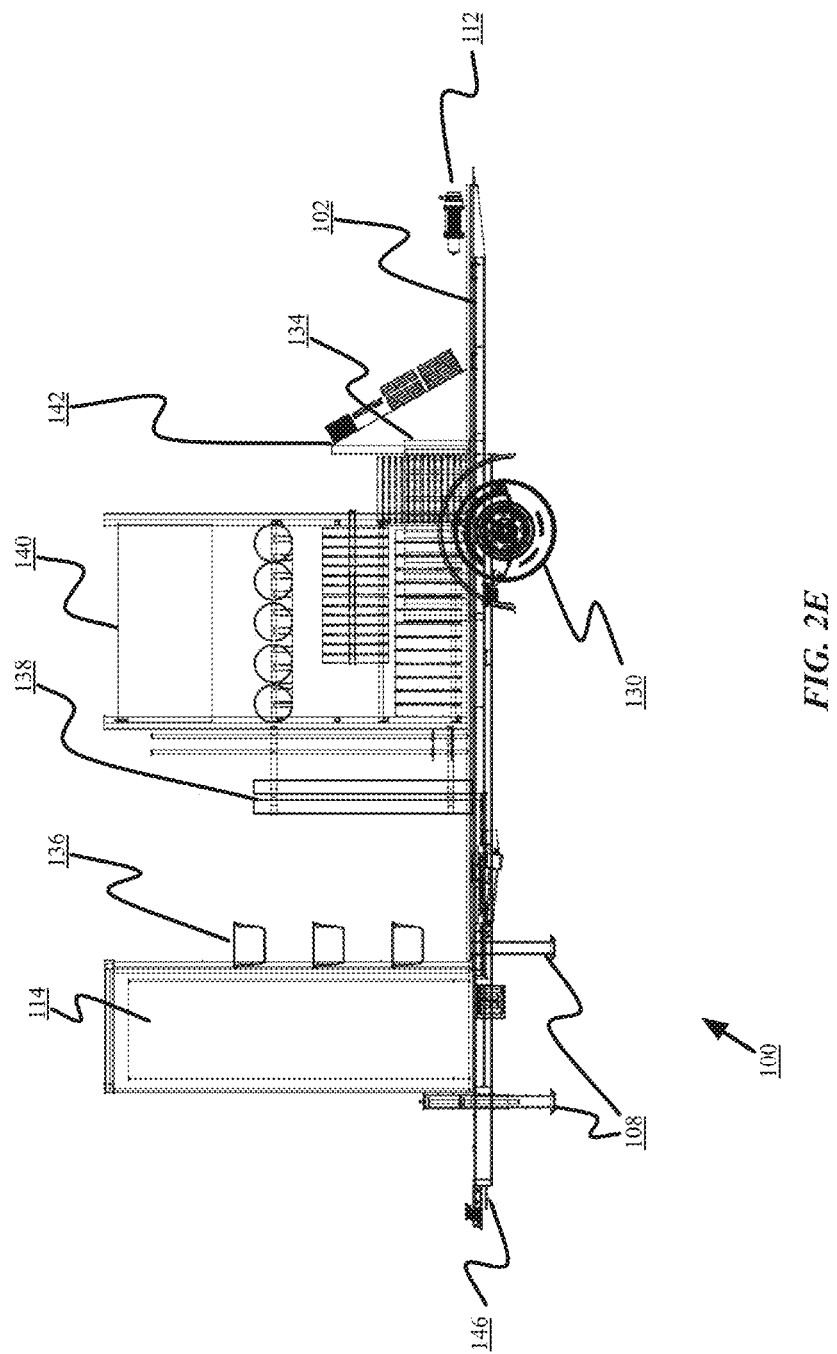
FIGS. 2E and 2F are left and right views, respectively of the central portion of the mobile fitness unit of FIG. 1B.
Figure 2F:
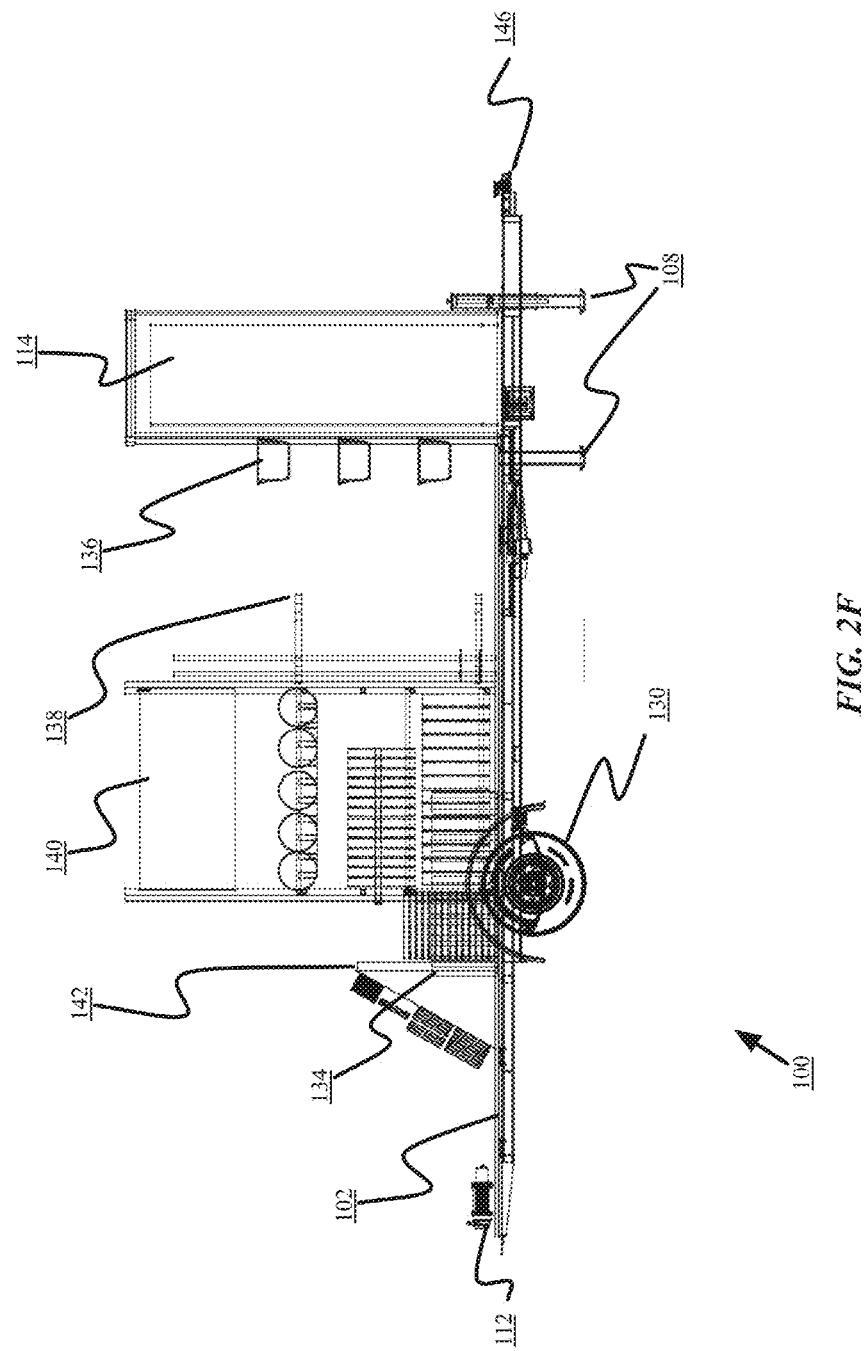

FIGS. 2C and 2D are front and rear views, respectively, of the central portion of the mobile fitness unit of FIG. 1B. As shown in FIG. 2C, in many embodiments, the mobile fitness unit 100 may include one or more jacks 108 or legs to extend from panels 104, 106, floor 102, and/or hitch 146 for stability when stationary. FIGS. 2E and 2F are left and right views, respectively of the central portion of the mobile fitness unit of FIG. 1B.

Figure 3A:
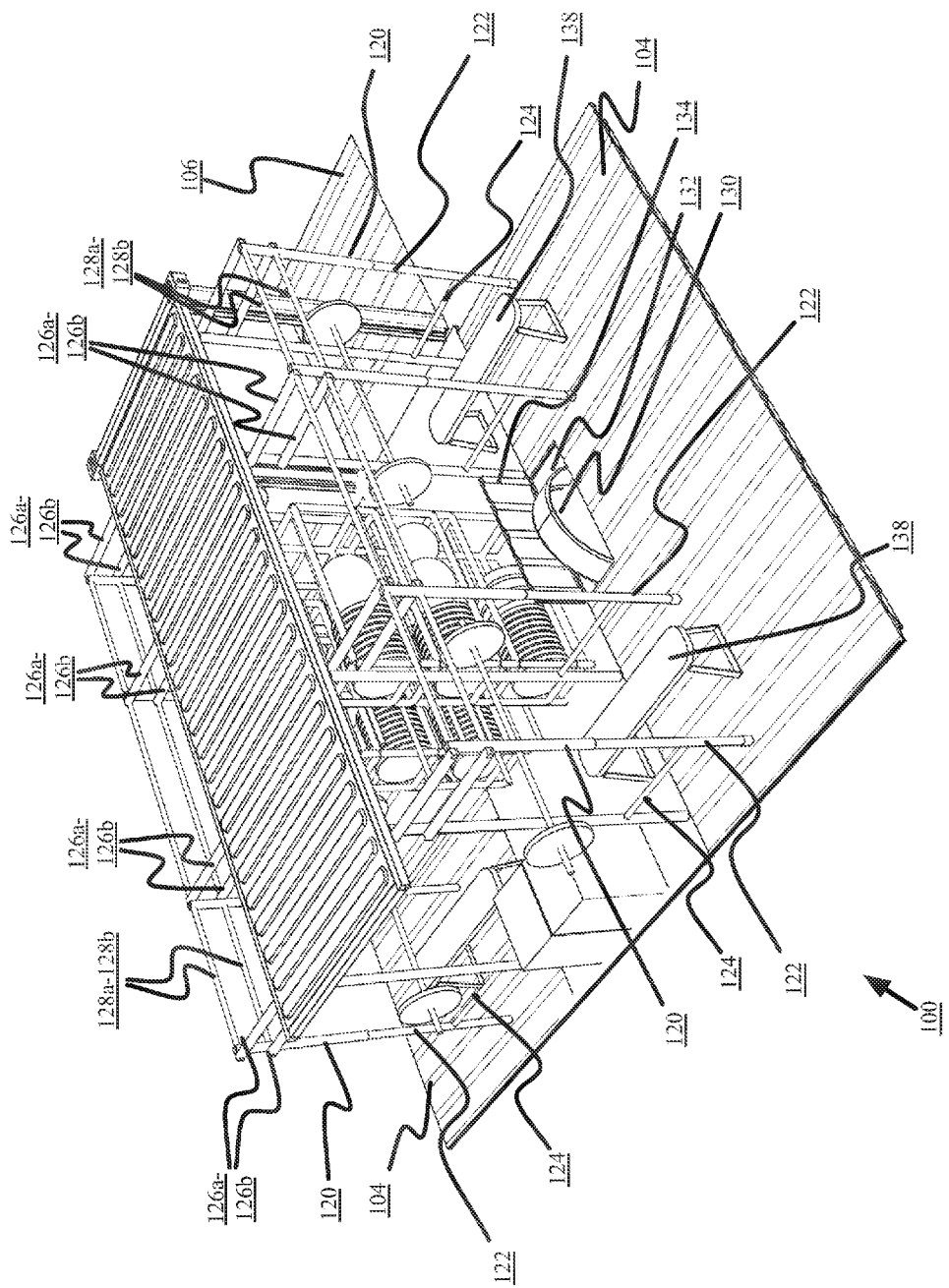
FIG. 3A is a perspective view of another embodiment of an unfolded mobile fitness unit.
Figure 3B:
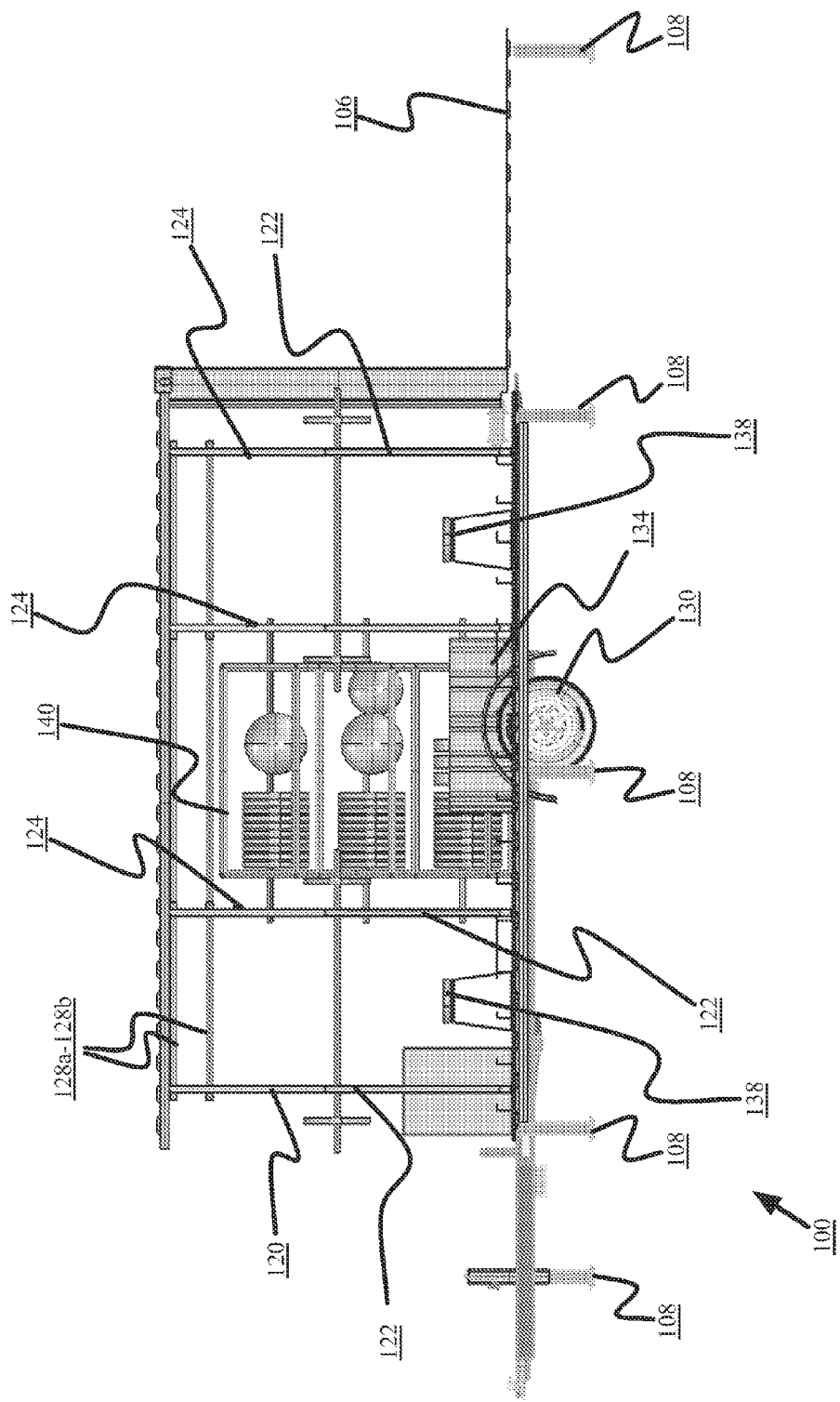
Figure 3D:
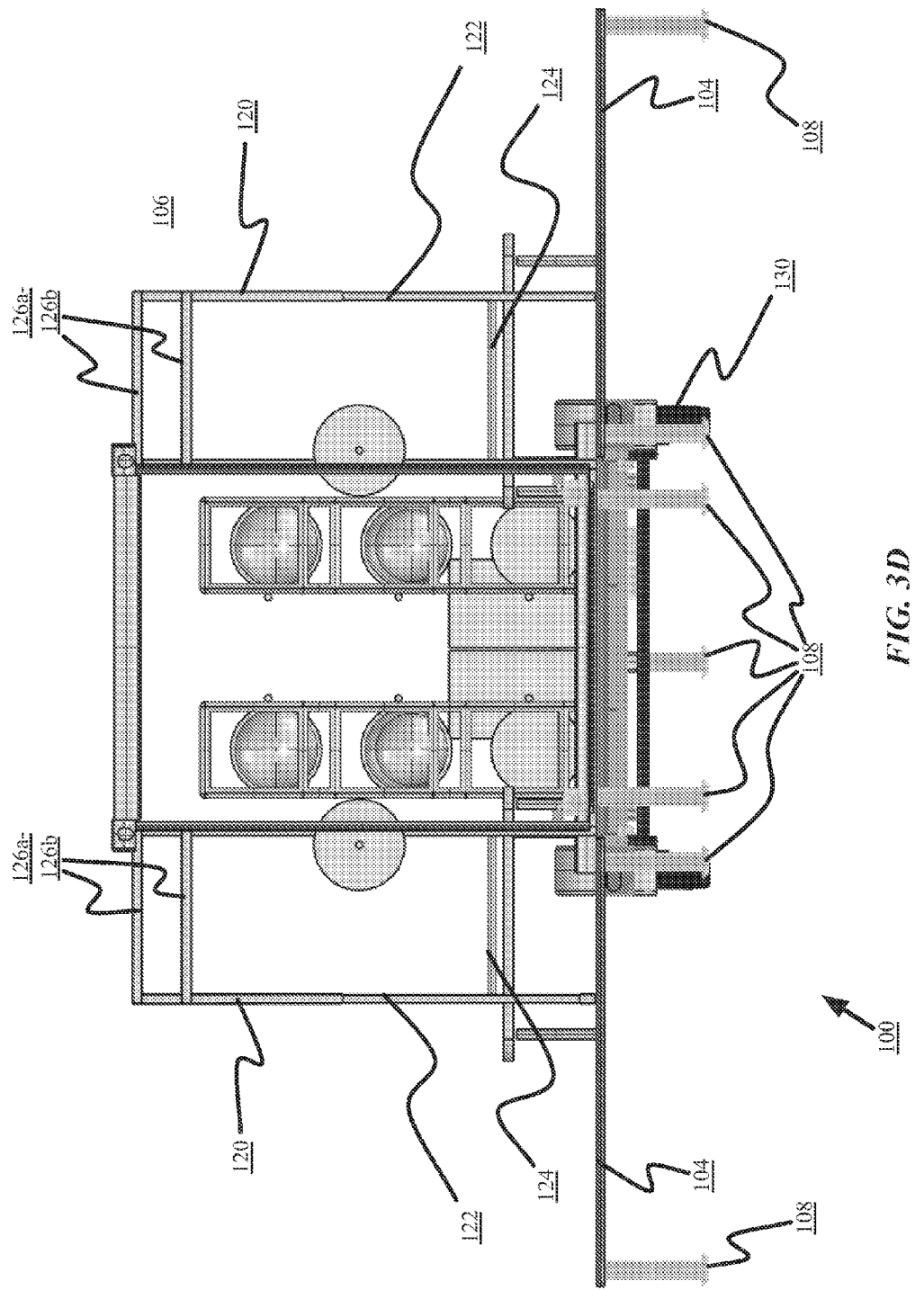

FIG. 3A is a perspective view of another embodiment of an unfolded mobile fitness unit. As shown, in some embodiments, the fitness unit may not include a storage/access section 114, and instead may have other storage or open areas. As shown, in typical use, users may place one or more exercise benches 138 in frames formed by beams 118, legs 120 and 122, lower lateral supports 124, upper lateral supports 126, and poles 118, for performing bench presses, shoulder presses, or other exercises. A large number of users may thus use the exercise equipment simultaneously. Similarly, multiple users may use equipment hanging from poles 118 in the center portion of panel 104 near wheel 130 or may use the poles for pull ups simultaneously. FIGS. 3B, 3C, and 3D are side, top, and rear views of the unfolded mobile fitness of FIG. 3A, showing the layout and arrangement of the supports, legs, and poles forming the frames.

Figure 4A:
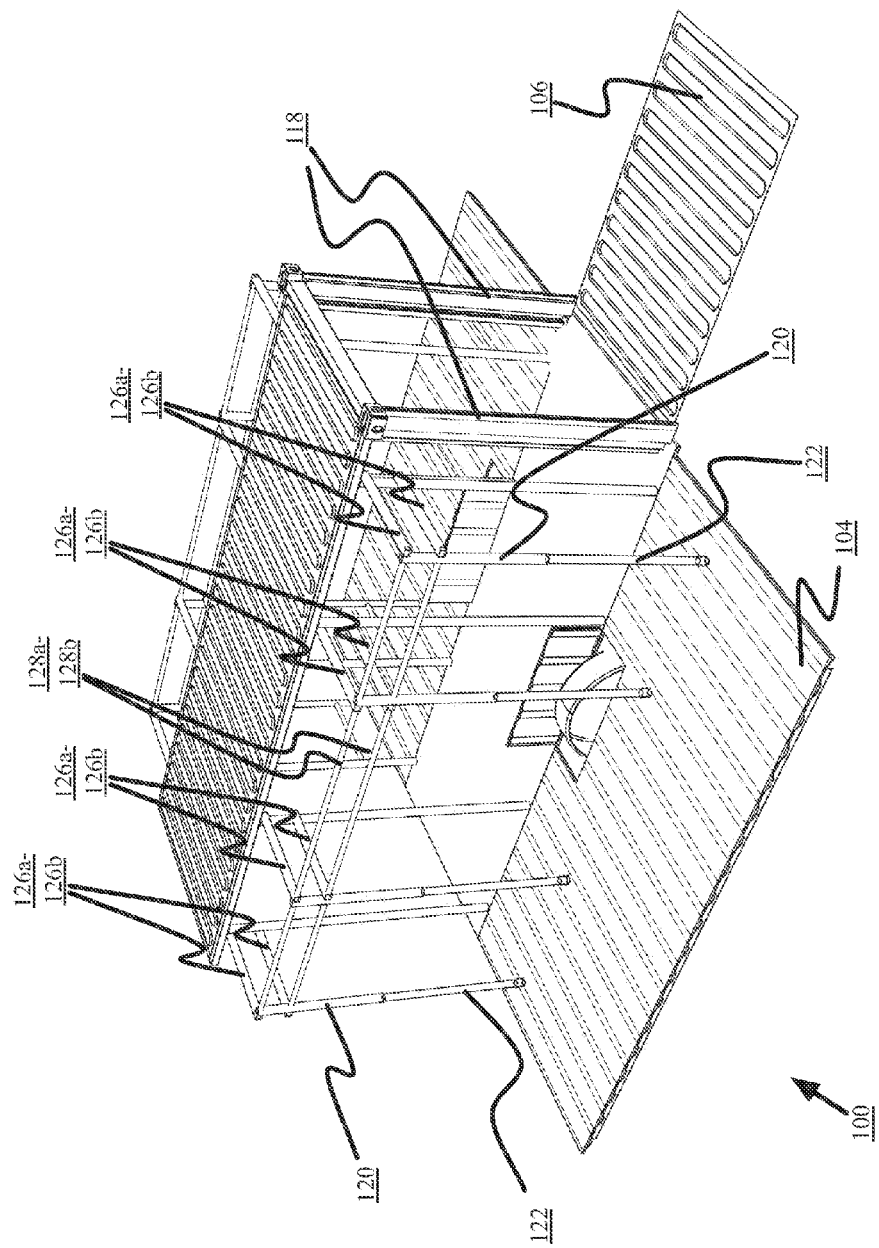
FIGS. 4A-4C are perspective views of an embodiment of a mobile fitness unit illustrating stages of folding of the unit.
Figure 4B:
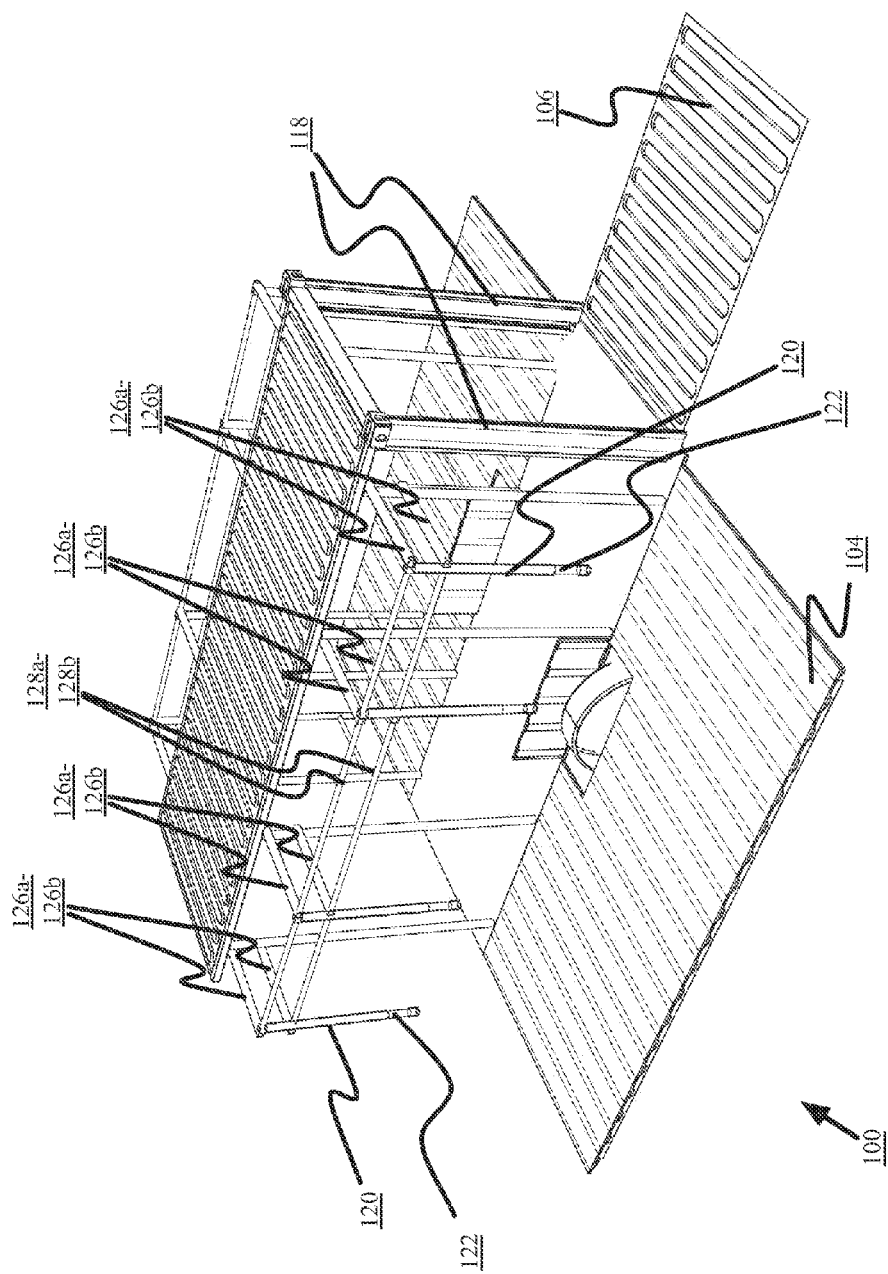
Figure 4C:
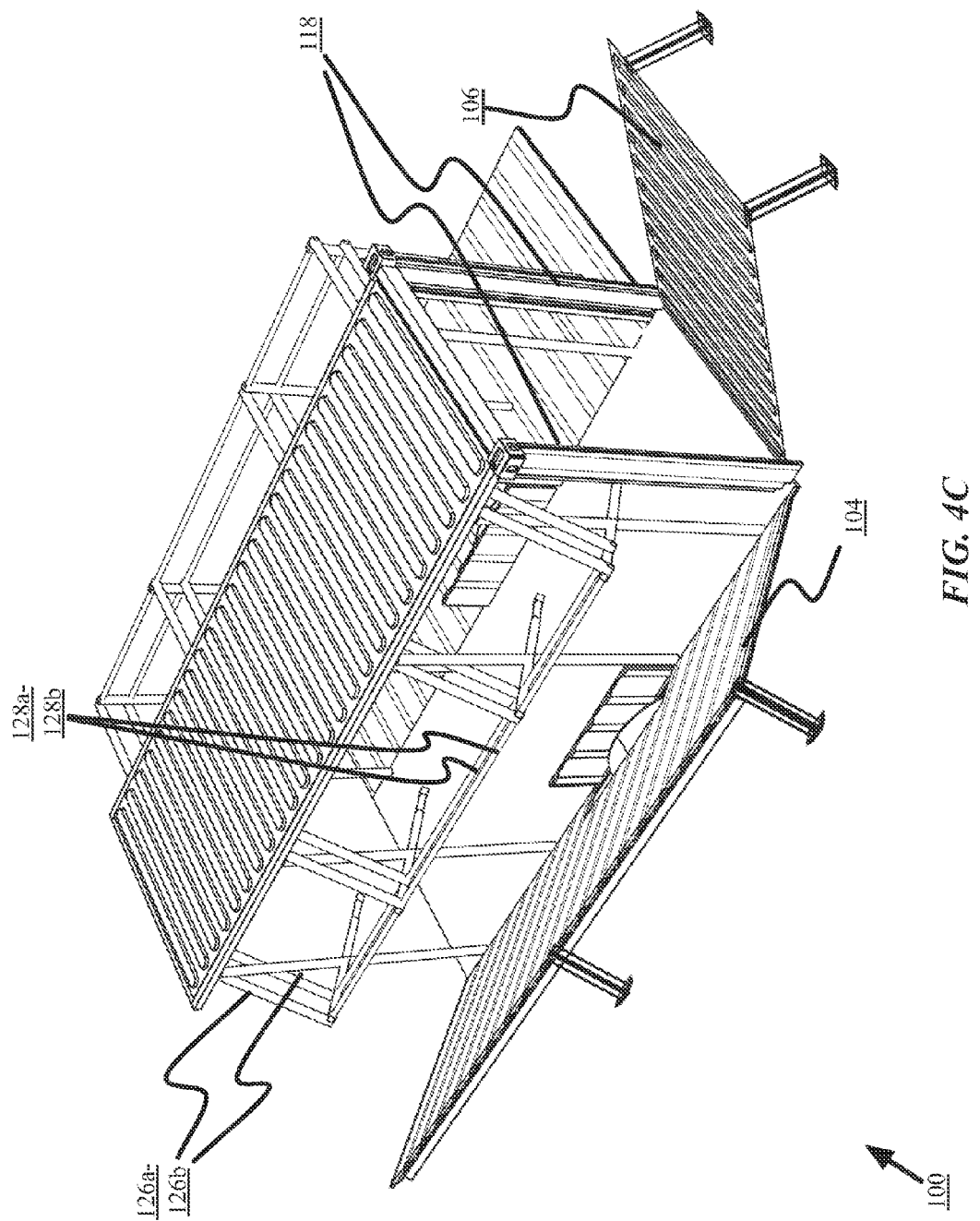

FIGS. 4A-4C are perspective views of an embodiment of a mobile fitness unit illustrating stages of folding of the unit in one implementation. Benches, weight racks, and other elements have been removed for clarity. During normal operation however, the weights would be returned to the racks and benches stacked as shown in FIG. 1B, and the mobile fitness unit 100 may fold without interference.

Lower portions 122 of legs may be unlocked and slid into upper portions 120, as shown in FIG. 4B. In one implementation of folding, lower lateral supports 124 may be removed, unscrewed, unlatched, or lifted from seats and stored separately. In implementations in which upper lateral supports 126 are fixed to upper portions 120 of legs at a set angle, the entire frame may rotate in place around hinges at the top of upper lateral supports, as shown in FIG. 4C. Panels 104 and 106 may be raised by winches 112 to close the mobile fitness unit 100. In some embodiments as discussed above, jacks 108 may fold flat against the panels 104, 106, while in other embodiments, jacks 108 may be removed and stored separately.

Figure 4D:
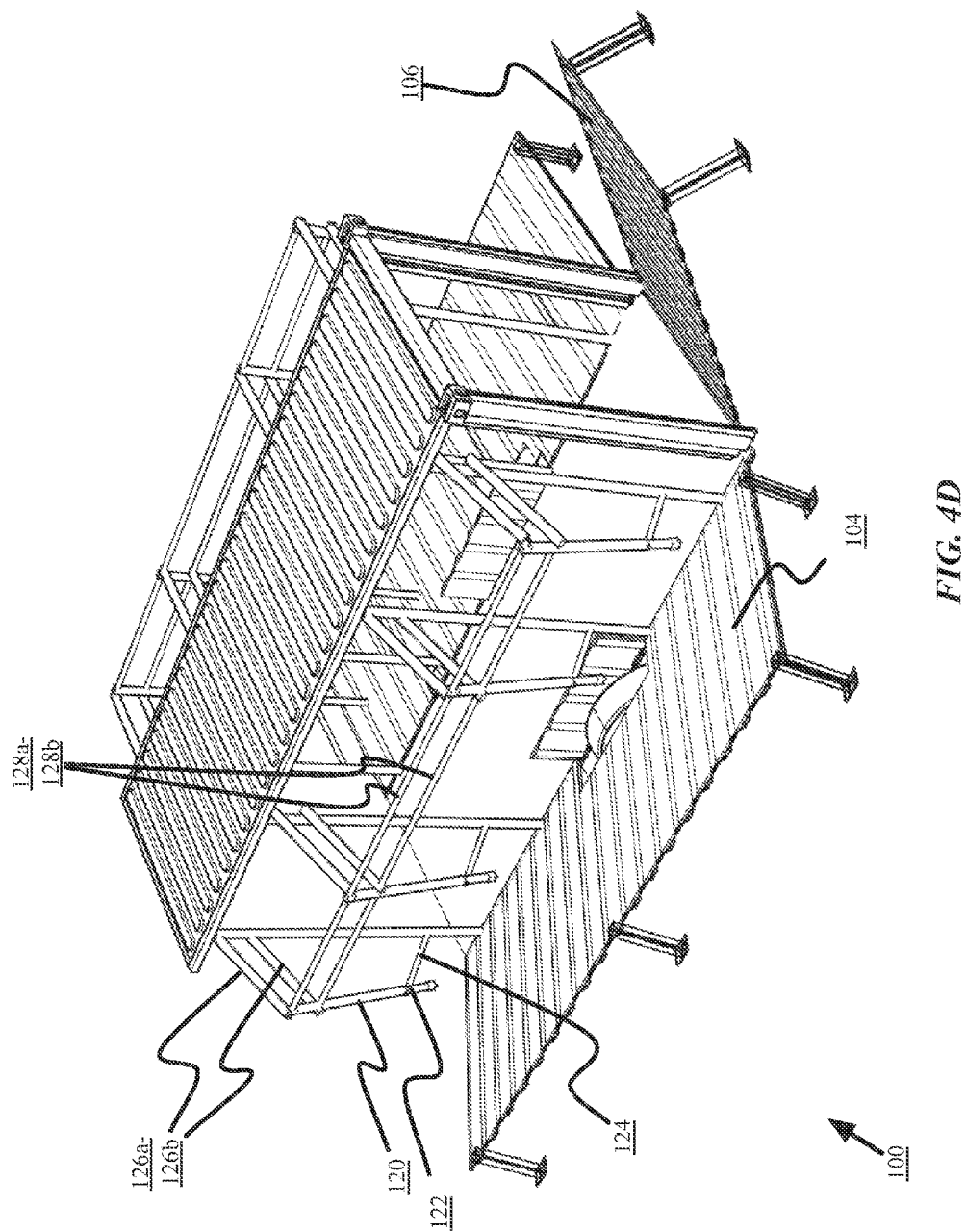
FIG. 4D is a perspective view of another embodiment of a mobile fitness unit illustrating another implementation of folding the unit.

In a slightly different implementation illustrated in FIG. 4D, lower lateral supports 124 may attach via hinges or pins to beams 118 and lower portions 122 of legs, and upper lateral supports 126*a-b* may be similarly hinged or pinned at beams 118 and upper portions 120 of legs or pivot around poles 128*a*-128*b*. The legs may be unlocked so that lower portion 122 may slide freely into upper portion 120. As the frame collapses, it may swing inwards as shown. Although legs 122 are shown separated from panel 104 for clarity, in many embodiments, the legs may simply be unlocked and the panel 104 raised. As the panel is raised, pressure against lower portions 122 by the panel may cause lower portions 122 to slide into upper portions 120, collapsing the frame as shown. In this implementation, the user needs merely unlock the legs via removable cotter pins, unlockable latches, push button releases, or other means, and operate the winches to collapse the frame and fold the mobile fitness unit for transport. Once panels 104, 106 have been raised, in many embodiments, external latches may be closed to secure the panels upright for safe travel.

To open the mobile fitness unit, a user need merely undo any latches on panels 104, 106, and either release the winches 112 or operate them in reverse (depending on winch type) to lower panels 104, 106. The user may extend lower portions 122 of the legs and lock them into position, forming the frame. In some embodiments, jacks 108 may be extended into position. As discussed above, in some embodiments, winch cables may be removed. Accordingly, the mobile fitness unit may be set up or collapsed in less than a minute in many embodiments.

Figure 4F:
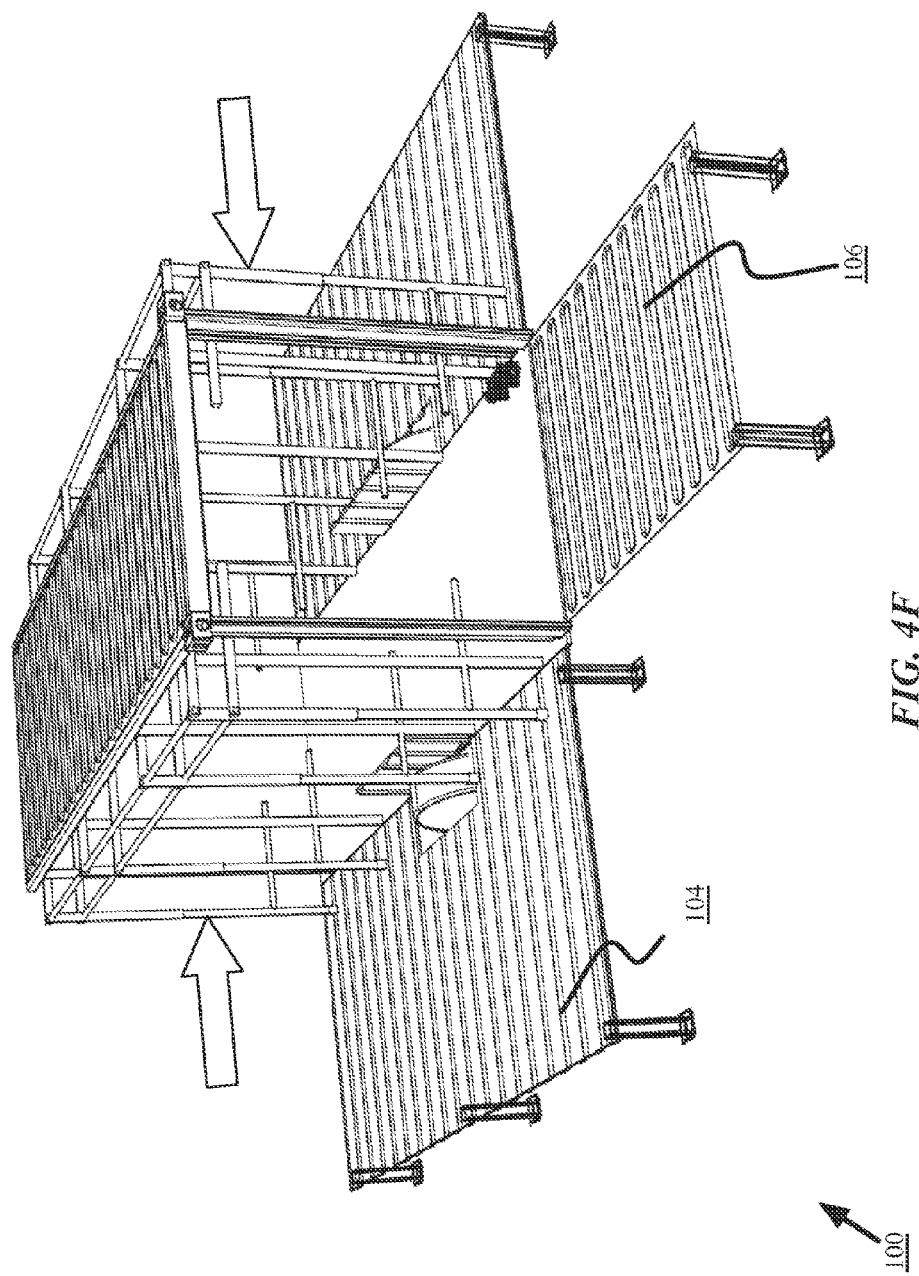
FIG. 4F is a perspective view of the embodiment of FIG. 4E illustrating an intermediate stage of folding the unit.

In another embodiment, the frames of lower and upper portions of legs, upper and lower lateral supports, and poles may be rigid with fixed joints for added strength. To allow for folding of the mobile fitness unit 100, the upper and lower lateral supports may be fixed to beams 118 via sliding joints allowing for lateral translation. In many embodiments, the joints may not allow for rotation. For example, the joints may comprise holes in beams 118 through which the lateral supports are inserted. In other embodiments, the joints may comprise square or round tubes attached to beams 118 and having an internal diameter slightly larger than that of the lateral supports to allow the lateral supports to be inserted and slid through said tubes. In one embodiment, the tubes may have sufficient length to prevent rotation or twisting of the frame. In some embodiments, the joints may incorporate latches, locks, cotter pins, or other means to prevent the frames from sliding in or out during use. To prevent collisions between frames on one side of the unit and frames on the other, the frames may be slightly offset towards the fore or aft of the mobile fitness unit, as shown in the top view of FIG. 4E. As shown in FIG. 4F (with internal structures removed for clarity), the frames may be slid laterally into the unit (shown by directional arrows). Once the frames are in position within the bounds of the roof 110 and central portion 102, side panels 104 and end panel 106 may be raised via winches 112, as discussed above. In this embodiment, there are fewer non-fixed joints, and so the frames may be stronger, allowing for larger users or heavier use.

Figure 5:
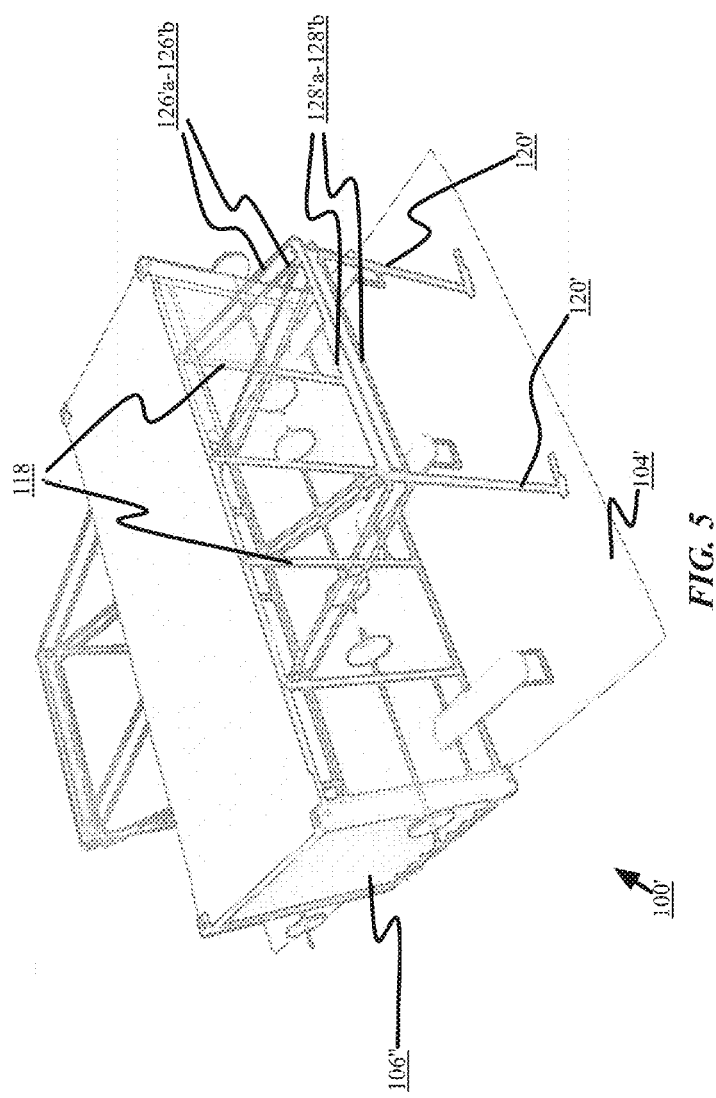
FIG. 5 is a perspective view of another embodiment of an unfolded mobile fitness unit.

FIG. 5 is a perspective view of another embodiment of an unfolded mobile fitness unit 100'. In the embodiment shown, the fitness unit 100' does not include wheels, and may be lifted into position as discussed above. Front and rear panels 104', 106' may remain upright in some embodiments, or may be released and lowered as discussed above.

In some embodiments, legs 120' may be non-collapsible. Instead, upper supports 126' may be hinged to rotate laterally rather than vertically. In one embodiment, a subset of the upper supports 126' may be removed, and poles 128'a-128'b and legs 120' may be moved laterally, rotating the upper supports 126' until the poles 128' lie flat against beams 118' and legs 120' are inside of panel 104' and the panels may be raised. In a similar embodiment, some of upper supports 126' may be pinned to rotate laterally, and other upper supports 126' may be attached to laterally sliding supports, such that the frame may be rotated and collapsed inward without removing any portions. In still other embodiments, legs 120' may be removed or may collapse, and the frame may be rotated downwards and inwards, similar to the embodiment shown in FIG. 4C.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed:

1. A folding mobile fitness unit, comprising:
   a floor;
   a plurality of beams attached to the floor;
   a roof supported by the plurality of beams; and
   at least one collapsible frame attached to an upper portion of one or more of the plurality of beams by a joint having one degree of freedom, the collapsible frame configured to extend outward laterally from the one or more beams;
   wherein each at least one collapsible frame comprises:
      at least one leg, comprising an upper portion and an extendable lower portion,
      at least one upper lateral support, attached to the upper portion of the at least one leg and the upper portion of the one or more of the plurality of beams by the joint having one degree of freedom, and
      at least one lower lateral support, attached to the extendable lower portion of the at least one leg and a lower portion of the one or more of the plurality of beams; and
   wherein the collapsible frame further comprises a pole attached to at least two upper lateral supports and/or the upper portions of at least two corresponding legs.

2. The folding mobile fitness unit of claim 1, wherein the pole is configured to serve as a pull-up bar.

3. The folding mobile fitness unit of claim 1, wherein the pole is configured to support at least one hanging fitness apparatus.

4. The folding mobile fitness unit of claim 1, wherein the at least one upper lateral support is attached to the upper portion of the at least one leg by a joint having one degree of freedom.

5. The folding mobile fitness unit of claim 1, wherein the at least one lower lateral support is attached to the lower portion of the at least one leg by a joint having one degree of freedom.

6. A folding mobile fitness unit, comprising:
   a floor;
   a plurality of beams attached to the floor;
   a roof supported by the plurality of beams; and
   at least one collapsible frame attached to an upper portion of one or more of the plurality of beams by a joint having one degree of freedom, the collapsible frame configured to extend outward laterally from the one or more beams;
   wherein each at least one collapsible frame comprises:
      at least one leg, comprising an upper portion and an extendable lower portion,
      at least one upper lateral support, attached to the upper portion of the at least one leg and the upper portion of the one or more of the plurality of beams by the joint having one degree of freedom, and
      at least one lower lateral support, attached to the extendable lower portion of the at least one leg and a lower portion of the one or more of the plurality of beams; and
   wherein the at least one lower lateral support is attached to the lower portion of the one or more of the plurality of beams by a joint having one degree of freedom.

7. The folding mobile fitness unit of claim 1, wherein the collapsible frame collapses inwards to a position between the floor and roof and inside of the panel, when the panel is rotated to the position orthogonal from the floor.

8. A folding mobile fitness unit, comprising:
   a floor;
   a plurality of beams attached to the floor;
   a roof supported by the plurality of beams; and
   at least one collapsible frame attached to an upper portion of one or more of the plurality of beams by a joint having one degree of freedom, the collapsible frame configured to extend outward laterally from the one or more beams; and
   at least one panel attached to an edge of the floor at a corresponding edge of said panel by a joint having one degree of freedom, the panel configured to rotate between a position parallel to the floor and a position orthogonal to the floor.

9. The folding mobile fitness unit of claim 1, further comprising:
   at least one panel attached to a corner of the floor by a joint having one degree of freedom, the panel configured to rotate to a position orthogonal to the floor.

10. The folding mobile fitness unit of claim 8, further comprising at least one winch attached to the at least one panel by a cable for rotating the panel between the position parallel to the floor and the position orthogonal to the floor.

11. The folding mobile fitness unit of claim 8, further comprising at least one axel and pair of wheels attached beneath the floor; and a towing hitch.

12. The folding mobile fitness unit of claim 11, wherein the at least one panel further comprises an opening positioned to receive a wheel of the pair of wheels when the panel is in the position parallel to the floor.

13. The folding mobile fitness unit of claim 12, further comprising a second at least one panel at least as large as the opening, fixed orthogonally to the floor and positioned to be adjacent to the opening when the panel is in the position orthogonal to the floor.

14. The folding mobile fitness unit of claim 11, further comprising at least one jack for supporting the panel off the ground in the position parallel to the floor.

15. The folding mobile fitness unit of claim 14, wherein the at least one jack is attached to the at least one panel.

16. The folding mobile fitness unit of claim 1, further comprising a storage and access area.

17. The folding mobile fitness unit of claim 1, further comprising at least one equipment rack attached to the floor.

18. The folding mobile fitness unit of claim 1, comprising two side panels and a rear panel, each attached to a corresponding corner of the floor by a joint having one degree of freedom, each panel configured to rotate in a different direction outward from the floor.

* * * * *